Oct. 15, 1963    R. D. COLLINS    3,106,785
EDUCATIONAL DEVICE
Filed March 6, 1961
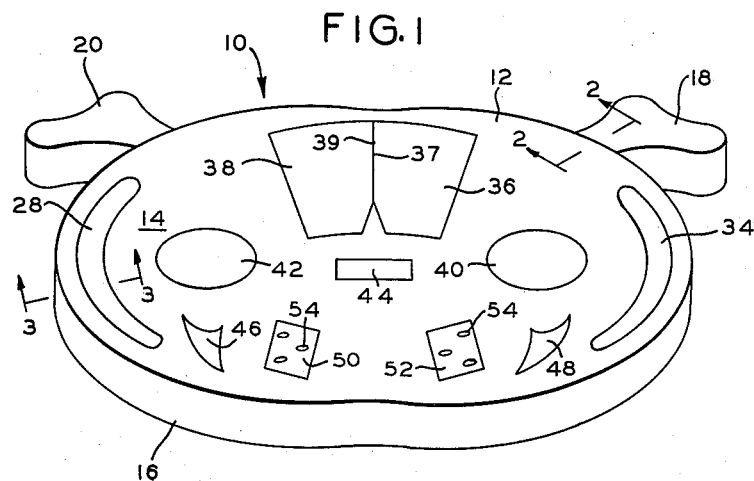
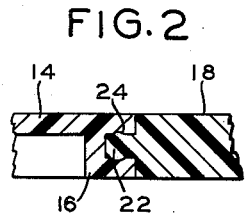
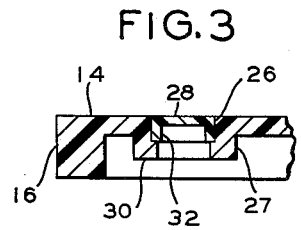
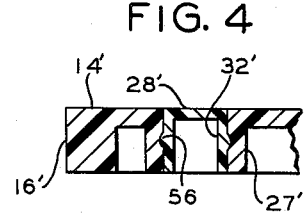
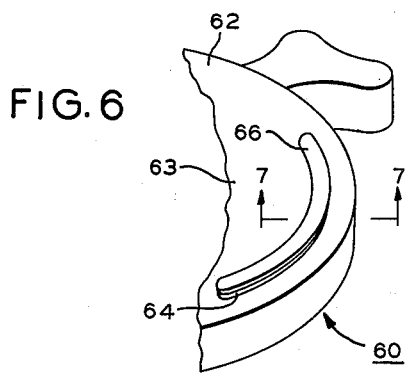
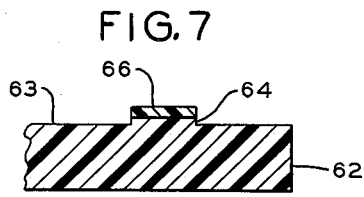
INVENTOR.
ROBERT DOUGLAS COLLINS
BY Arthur H. Seidel
ATTORNEY

United States Patent Office 3,106,785
Patented Oct. 15, 1963
:::

3,106,785
EDUCATIONAL DEVICE
Robert Douglas Collins, 2705 Cranston Road,
Philadelphia 31, Pa.
Filed Mar. 6, 1961, Ser. No. 93,747
7 Claims. (Cl. 35—17)

This invention relates to an educational device, and more particularly, to an educational device for teaching the components and diseases associated with a particular portion of the anatomy of a human being. More specifically, the present invention may be termed an educational device simulating a clinicopathological spinal cord.

Heretofore, the only educational devices available for teaching and/or demonstrating the components and diseases associated with a portion of the anatomy of a human being, such as the spinal cord, were books and/or charts. Such books or charts are unidimensional insofar as their use is concerned in the teaching of medical students or in the explanation to a patient as to the nature of their spinal cord deficiencies. The present invention is in the nature of a three dimensional educational device. It will be appreciated by those skilled in the art that a three dimensional educational device is superior to educational devices in the form of books, charts, etc.

The spinal cord is the attenuated, nearly cylindrical part of the cerebrospinal axis which lies in the vetebral canal. The average length of a spinal cord in a male is between eighten and twenty inches and in a female between sixteen and nineteen inches in length. The size of the spinal cord varies along its length, however a cross-sectional view taken at various places would disclose substantially the same tracts and cells. If a transverse section of the spinal cord would be made, it would consist of white and gray nerve matter having tracts and cells. The color of the gray matter would vary according to the degree of capillary injection and the age of the individual. The arrangement of the gray matter in amount and proportion to the white matter varies in different parts of the spinal cord.

The nerve matter of the spinal cord is comprised of nerve tissue having a plurality of tracts and cells. The educational device of the present invention is adapted to be utilized in the explanation of the components of the spinal cord and the relationship between the tracts, cells and various diseases associated with the spinal cord. However, it will at once be apparent to those skilled in the art that the components and diseases associated with other portions of the anatomy, such as the brain stem, may likewise be taught with an educational device of the type of the present invention.

It is an object of the present invention to provide a novel educational device.

It is another object of the present invention to provide a novel educational device particularly adapted for teaching the components and diseases of the spinal cord.

It is another object of the present invention to provide a novel educational device having removable components which are adapted to simulate the effect on, absence, or presence of various tracts and/or cells of the spinal cord.

It is still another object of the present invention to provide a novel educational device wherein elements simulating tracts and/or cells in a spinal cord or the like, are removably secured to a base simulating the nerve tissue of the spinal cord or the like.

It is a further object of the present invention to provide a novel educational device simulating a cross-sectional view of a spinal cord which is inexpensive and simple to manufacture.

Other objects will appear hereinafter.

For the purpose of illustrating the invention there is shown in the drawing forms which are presently preferred; it being understood, however, that this invention is not limited to the precise arrangements and instrumentalities shown.

FIGURE 1 is a perspective view of the educational device of the present invention.

FIGURE 2 is a transverse sectional view taken along the lines 2—2 in FIGURE 1.

FIGURE 3 is a transverse sectional view taken along the lines 3—3 in FIGURE 1.

FIGURE 4 is a transverse sectional view of a portion of an alternative embodiment of the present invention.

FIGURE 5 is a transverse sectional view of a portion of another alternative embodiment of the present invention.

FIGURE 6 is a partial perspective view of still another embodiment of the present invention.

FIGURE 7 is a transverse sectional view taken along the lines 7—7 in FIGURE 6.

Referring to the drawing in detail, wherein like numerals indicate like elements, there is shown in FIGURE 1 an educational device designated generally as 10. The educational device 10 comprises a base 12 which simulates the nerve tissue of the spinal cord. The base 12 is representative of a cross-sectional view of a spinal cord and is provided with a planar upper surface 14 and a depending side wall 16 extending from the periphery of the surface 14. As shown in FIGURE 1, the base 12 is provided with a shape which is generally elliptical.

A pair of ears 18 and 20 extend from the side wall 16 of the base 12. The ear 18 simulates the left dorsal root ganglion cell. The ear 20 simulates the right dorsal root ganglion cell. As shown more clearly in FIGURE 2, the ear 18 is provided with a stud 22 which extends into a blind hole in the side wall 16 of the base 12. The periphery of the stud 22 is provided with a ridge 24 which snap fits into a recess in the blind hole in the side wall 16. The stud 22 is preferably non-circular in transverse cross-section so as to prevent the ear 18 from rotating relative to the base 12. It will be understood that the ear 20 is removably secured to the base 12 in a manner identical with the securement between the ear 18 and the base 12.

The base 12 is provided with a plurality of apertures within which elements are removably mounted. As shown more clearly in FIGURE 3, the base 12 is provided with an aperture 26 surrounded by a depending wall 27. A removable element or knock out plug 28 is disposed within the aperture 26. The removable element 28 is provided with a depending flange 32 which is supported on a radially directed flange 30. The flange 30 is integral with the wall 27 and supports the flange 32 of the element 28 so that the uppermost surface of the element 28 is flush with the surface 14 on the base 12.

The element 28 is elongated as shown more clearly in FIGURE 1 and simulates the right spinocerebellar tract. The base 12 is provided with another aperture, similar to aperture 26, within which is disposed elements 36 and 38. The elements 36 and 38 are provided with edges 37 and 39 respectively which are in abutting contact. The element 36 simulates the left posterior column. The element 38 simulates the right posterior column.

In a similar manner, the base 12 is provided with a removable element 40 simulating the left lateral column, a removable element 42 simulating the right lateral column, a removable element 44 simulating the ventral commissure. The base 12 is also provided with a removable element 46 simulating the right lateral spinothalamic tract, element 48 simulating the left lateral spinothalamic tract, a removable element 50 simulating the right-ventral horn cells, and a removable element 52 simuating the left ventral horn cells. The removable elements 50 and 52 are provided with circles 54 which simulate nerve cells.

FIGURE 4 discloses an alternative embodiment of the present invention which is identical with the structure shown in FIGURES 1–3 except as will be made clear hereinafter. As shown in FIGURE 4, the removable element 28′ may be snap fitted to the wall 27′ by the provision of an annular ridge 56 which snap fits into a groove on the inner peripheral surface of the wall 27′. The ridge 56 extends radially outwardly from the outer peripheral surface of the flange 32′ on the removable element 28′. The relationship of the ridge 56 and its cooperating groove enables the upper surface of the removable element 28′ to be flush with the planar upper surface 14′. In all other respects, the embodiment shown in FIGURE 4 is identical wtih the embodiment shown in FIGURES 1–3.

Another alternative embodiment of the present invention is shown in FIGURE 5. In FIGURE 5, the base 12″ is solid so that its upper and lower surfaces lie in parallel planes. Likewise, the removable element 28″ is a solid member. The removable element 28″ is removably secured to the base 12″ in the same manner as the removable element 28′. In all other respects, the embodiment of the present invention shown in FIGURE 5 is identical with the preferred embodiment shown in FIGURES 1–3.

FIGURE 6 discloses another embodiment of the present invention designated generally as 60. FIGURE 6 discloses a partial perspective view of a base 62 which may be identical with the base in any of the embodiments shown in FIGURES 1–5. The upper surface 63 of the base 62 corresponds with the surface 14 in FIGURES 1–3. The surface 63 is provided with a plurality of bosses. As shown more clearly in FIGURE 7, the surface 63 is provided with a boss 64 which corresponds with the shape of the removable element 66.

The removable element 66 is provided on one surface with a pressure sensitive adhesive coating. The removable element 66 corresponds with the removable element 34 and simulates the left spinocerebellar tract. The surface 63 will be provided with other bosses corresponding with the shape of the removable elements shown in FIGURE 1.

The embodiments of the present invention are utilized in the following manner:

The base of the various embodiments of the present invention is preferably made from a light weight material such as plastic. It will be understood that rubber, synthetic resins, etc. are embraced within the generic term "plastic." Preferably, the base is made from a material having a contrasting color with respect to the color of the removable elements.

If desired, the removable elements themselves may be provided with contrasting colors. For example, the removable elements 40 and 42 may be colored white while the removable elements 50 and 52 may be colored gray.

When the educational device of the present invention is being used, the base 12 will be held by the instructor. As the various components of the spinal cord are enumerated and explained, the removable element corresponding to a particular component may be removed from its securement with the base 12.

In a discussion centered around the various diseases associated with the spinal cord, the removability of the elements simulating the components of the spinal cord and the particular elements which have been removed from the base 12 are of great significance. For example, the removal of the elements 36, 38, 40 and 42 simulates the pathology of the disease pernicious anemia. The following table is representative of some of the more common diseases associated with the spinal cord and the removable elements associated with the disease.

| Disease: | Removable element |
| --- | --- |
| Amyotrophic lateral sclerosis | 40, 42, 50 and 52. |
| Progressive muscular atrophy, poliomyelitis, and Werdnig-Hoffman Disease | 50 and 52. |
| Syringomyelia and intramedullary tumor | 40, 44 and 48. |
| Tabes dorsalis | 18, 20, 36 and 38. |
| Infectious polyneuritis (Gullian Barre's disease) | 18, 20, 50 and 52. |
| Friedreich's ataxia | 28, 34, 36, 38, 40 and 42. |
| Brown-Sequard syndrome of spinal cord tumors | 18, 34, 36, 40, 48 and 52. |

It will be appreciated that the above table is merely illustrative of the various diseases which may be more effectively explained by means of the educational device of the present invention.

The base of the various embodiments of the present invention, as shown in the drawing, and the removable elements simulate a cross-sectional view of the spinal cord at the level of the neck. This level was chosen since it is functionally representative of the levels of the spinal cord.

In the above embodiments, the elements simulating nerve tracts or nerve cells are secured to the base in a manner which provides for facile removal therefrom. In FIGURES 1–3, the removable elements are provided with peripheral dimensions which result in a slight force fit between the elements and their respective apertures in the base. In FIGURES 4 and 5, the elements are snap-fitted to the base. The removable elements 18 and 20 are snap-fitted to the wall 16 of the base 12. In FIGURES 6 and 7, the removable elements are adhesively secured to embossments on the base 62 in a manner which provides for facile removal therefrom. The embossments on the surface 63 in FIGURES 6 and 7 provide for the replacement of the removable elements in their proper relationship.

The present invention may be embodied in other specific forms without departing from the spirit or essential attributes thereof and, accordingly, reference should be made to the appended claims, rather than to the foregoing specification as indicating the scope of the invention.

I claim:

1. An educational device comprising means simulating a clinicopathological spinal cord, said means including a substantially flat base simulating nerve tissue of a spinal cord, elements simulating nerve tracts removably secured to said base, elements simulating nerve cells removably secured to said base, elements simulating posterior and lateral columns removably secured to said base, said elements lying substantially in the same plane and being representative of components of a spinal cord occurring at various levels in a spinal cord, whereby the components and diseases of a pathological spinal cord may be more effectively taught to a novice.

2. An educational device in accordance with claim 1 wherein said base is made from a plastic material and is provided with a planar upper surface, said elements being removably secured to said base so that an upper surface on said elements is flush with the upper surface on said base.

3. An educational device in accordance with claim 1 wherein said elements simulating nerve cells are ears projecting beyond a side wall of said base, said ears simulating left and right dorsal root ganglion.

4. An educational device in accordance with claim 1 wherein a majority of said removable elements are force fitted within apertures in said base.

5. An educational device in accordance with claim 1 wherein a majority of said removable elements are snap-fitted to said base.

6. An educational device in accordance with claim 1 wherein said base is provided with a flat upper surface, embossments on said flat upper surface, said embossments having a shape corresponding to the shape of said removable elements simulating nerve tracts, and said removable elements simulating nerve tracts being adhesively secured to said embossments.

7. An educational device comprising means simulating a clinicopathological spinal cord, said means including a substantially elliptical base simulating nerve tissue of a spinal cord, the length of the major and minor diameters of said base being substantially greater than the thickness of said base, means removably securing a first set of elements to said base, said elements simulating nerve tracts, means removably securing a second set of elements to said base, said second set of elements simulating nerve cells, said first and second sets of elements lying in substantially the same plane and being representative of components of the spinal cord which are found at different levels in a spinal cord.

References Cited in the file of this patent

UNITED STATES PATENTS

| | | |
|---|---|---|
| 2,592,078 | Taylor et al. | Apr. 8, 1952 |
| 2,981,009 | Lindquist | Apr. 25, 1961 |
| 2,995,833 | Bezark | Aug. 15, 1961 |

OTHER REFERENCES

Chicago Apparatus Co. Catalog No. 44, pages 790 and 791 only are relied on (1931).

Clay-Adams Co. Catalog No. 105, pages 168 and 169 only are relied on (1953).